United States Patent [19]

Kiuchi et al.

[11] Patent Number: 5,642,521

[45] Date of Patent: Jun. 24, 1997

[54] DATA PROCESSING APPARATUS FOR EXTRACTING AND PROCESSING ARBITRARY RECORDS FROM A FILE

[75] Inventors: Hiroyoshi Kiuchi, Hachioji; Takashi Kurihara, Musashimurayama; Toshio Touhara, Oome, all of Japan

[73] Assignee: Casio Computer Co., Ltd., Tokyo, Japan

[21] Appl. No.: 261,723

[22] Filed: Jun. 17, 1994

[30] Foreign Application Priority Data

Jun. 22, 1993 [JP] Japan .................................. 5-173634
Jun. 22, 1993 [JP] Japan .................................. 5-173635

[51] Int. Cl.⁶ .............................. G06F 7/00; G06F 17/30
[52] U.S. Cl. ................................... 395/779; 395/601
[58] Field of Search ................................ 364/401, 406, 364/408, 405; 395/600

[56] References Cited

U.S. PATENT DOCUMENTS

| | | |
|---|---|---|
| 4,852,019 | 7/1989 | Vinberg et al. . |
| 5,093,779 | 3/1992 | Sakurai . |
| 5,189,608 | 2/1993 | Lyons et al. ............... 364/408 |
| 5,201,047 | 4/1993 | Maki et al. . |
| 5,202,984 | 4/1993 | Kashio ....................... 395/600 |
| 5,247,666 | 9/1993 | Buckwold . |
| 5,257,365 | 10/1993 | Powers et al. . |
| 5,280,609 | 1/1994 | Macphail . |
| 5,283,892 | 2/1994 | Nakane et al. . |
| 5,297,280 | 3/1994 | Potts, Sr. et al. . |
| 5,301,313 | 4/1994 | Terada et al. . |
| 5,333,315 | 7/1994 | Saether et al. . |
| 5,359,724 | 10/1994 | Earle . |

*Primary Examiner*—Gail O. Hayes
*Assistant Examiner*—Steven R. Yount
*Attorney, Agent, or Firm*—Frishauf, Holtz, Goodman, Langer & Chick

[57] ABSTRACT

Disclosed is a data processing apparatus by which, when an output level is designated and code conditions indicating target items at the time of extracting an output record are designated in the desired order in association with a plurality of items to obtain a desired slip, records that match with a plurality of code conditions are read from a predetermined file and are output in the designated order in association with the output level. Therefore, records that match with a plurality of code conditions will be grouped into a hierarchical structure as specified by simply designating code conditions indicating the target items in association with a plurality of items at the time of extracting the output level and output records.

5 Claims, 21 Drawing Sheets

| SALES RECORD TABLE | | |
|---|---|---|
| OFFICE | SALES AMOUNT | |
| B OFFICE | 600,000 | |
| ○○ SHOP | 200,000 | |
| ×× STORE | 400,000 | |
| E OFFICE | 50,000 | |
| △△ SHOP | 50,000 | |

FIG.2

SALES RECORD TABLE

| OFFICE | SALES AMOUNT | |
|---|---|---|
| B OFFICE | 600,000 | |
| ○○ SHOP | 200,000 | |
| ×× STORE | 400,000 | |
| E OFFICE | 50,000 | |
| △△ SHOP | 50,000 | |

FIG.3A

TABLE A

| SERIAL NO. | TOTALIZATION LEVEL A | TOTALIZATION LEVEL B | TOTALIZATION LEVEL C | OUTPUT ORDER | MANAGEMENT UNIT | COLLECTION FILE | |
|---|---|---|---|---|---|---|---|
| | | | | | | (FIRST DESIGNATION ITEM) OFFICE CODE | (SECOND DESIGNATION ITEM) CUSTOMER CODE |
| 01 | (OFFICE) | | | CODE ORDER | | 10? | |
| 02 | | (CUSTOMER) | | CODE ORDER | ○ | | 3??? |
| 03 | | | | | | | |
| 04 | | | | | | | |

FIG.3B

TABLE B

| | A | B | C |
|---|---|---|---|
| | | SALES AMOUNT | ∼ |
| | FORMAT | #,###,##0 | ∼ |
| | TARGET FILE | COLLECTION FILE | ∼ |
| | TOTALIZATION ITEM | SALES AMOUNT | ∼ |

FIG. 4A

FILE RECOGNITION TABLE

| ITEM NAME | TABLE NAME |
|---|---|
| OFFICE CODE | OFFICE TABLE |
| PERSON-IN-CHARGE CODE | PERSON-IN-CHARGE TABLE |
| CUSTOMER CODE | CUSTOMER TABLE |

FIG. 4B

OFFICE TABLE

| KEY ITEM CODE | REFERENCE NAME |
|---|---|
| 101 | A OFFICE |
| 102 | B OFFICE |
| 103 | C OFFICE |
| 105 | E OFFICE |
| 110 | P OFFICE |

FIG. 4C

CUSTOMER TABLE

| KEY ITEM CODE | REFERENCE NAME |
|---|---|
| 3001 | ○○ SHOP |
| 3002 | ○× SHOP |
| 3003 | ×× STORE |
| 3101 | △× STORE |
| 3102 | △△ SHOP |
| 3103 | ×△ STORE |

FIG.9A

STATE STRUCTURE RECORD PRODUCTION

| B011023001 | A01102 | 1 | B OFFICE |
|---|---|---|---|
| SUB-CODE | PARENT CODE | END MARK | NAME |

FIG.9B

| | A | B | C |
|---|---|---|---|
| LEVEL ROW | A 01 102 | B 01 102 3001 | |
| NAME | B OFFICE | ○ ○ SHOP | |

LAST-ITEM WORK MEMORY

FIG.9C

| 1023001 | B011023001 | | ○○ SHOP |
|---|---|---|---|
| SUB-CODE | PARENT CODE | END MARK | NAME |

FIG.9D (SOURCE) COLLECTION FILE

| ...... | OFFICE CODE | CUSTOMER CODE | ............ |
|---|---|---|---|
| ...... | 112 | 3001 | ............ |
| ...... | 102 | 3001 | ............ |
| ...... | 102 | 3003 | ............ |
| ...... | 105 | 3102 | ............ |
| ...... | 125 | 2001 | ............ |

FIG.10

STRUCTURE FILE

| SUB-CODE | PARENT CODE | END MARK | NAME |
|---|---|---|---|
| B011023001 | A01102 | 1 | B OFFICE |
| 1023001 | B011023001 | | ○○ SHOP |
| B011023003 | A01102 | 1 | B OFFICE |
| 1023003 | B011023003 | | ×× STORE |
| B011053102 | A01105 | 1 | E OFFICE |
| 1053102 | B011053102 | | △△ SHOP |
| | | | |
| | | | |

FIG.12

(SOURCE) COLLECTION FILE

| ---- | OFFICE CODE | CUSTOMER CODE | -------- | SALES AMOUNT |
|------|-------------|---------------|----------|--------------|
| ---- | 112 | 3001 | ------ | 800,000 |
| ---- | 102 | 3001 | ------ | 200,000 |
| ---- | 102 | 3003 | ------ | 400,000 |
| ---- | 105 | 3102 | ------ | 50,000 |
| ---- | 125 | 2001 | ------ | 120,000 |

DEVELOPMENT RECORD

|  | A (GROUP KEY) | B | C |
|---|---|---|---|
| 1ST RECORD | 1023001 | 200,000 | |
| 2ND RECORD | 1023003 | 400,000 | |
| 3RD RECORD | 1053102 | 50,000 | |

FIG.14A

DEVELOPMENT FILE

| A | B | C |
|---|---|---|
| 1023001 | 200,000 | |

STRUCTURE FILE

| 1023001 | B011023001 | ○○SHOP |

TOTALIZATION RECORD

KEY: 011023001

| A | | B |
|---|---|---|
| B | ○○ SHOP | 200,000 |

FIG.14B

DEVELOPMENT RECORD TO BE NEWLY PRODUCED

| A | B | C |
|---|---|---|
| B011023001 | 200,000 | |

FIG.15

TOTALIZATION FILE

KEY

| 011023001 | B | ○○ SHOP | 200,000 | |
|---|---|---|---|---|
| 011023003 | B | ×× STORE | 400,000 | |
| 011053102 | B | △△ SHOP | 50,000 | |
| 01102 | A | B OFFICE | 600,000 | |
| 01105 | A | E OFFICE | 50,000 | |

↓ SORT (CODE ORDER)

| 01102 | A | B OFFICE | 600,000 | |
|---|---|---|---|---|
| 011023001 | B | ○○ SHOP | 200,000 | |
| 011023003 | B | ×× STORE | 400,000 | |
| 01105 | A | E OFFICE | 50,000 | |
| 011053102 | B | △△ SHOP | 50,000 | |

FIG.16

TABLE A

| SERIAL NO. | TOTALIZATION LEVEL A | TOTALIZATION LEVEL B | TOTALIZATION LEVEL C | OUTPUT ORDER | MANAGEMENT UNIT | COLLECTION FILE | |
|---|---|---|---|---|---|---|---|
| | | | | | | (FIRST DESIGNATION ITEM) OFFICE CODE | (SECOND DESIGNATION ITEM) CUSTOMER CODE |
| 01 | (OFFICE) | | | CODE ORDER | | 10? | |
| 02 | | (CUSTOMER) | | CODE ORDER | ○ | | 3??? |
| 03 | | ZZ SALES | | | ○ | 105 | 2001 |
| 04 | | | | | | | |

FIG.17

STRUCTURE FILE

| SUB-CODE | PARENT CODE | END MARK | NAME |
|---|---|---|---|
| B011023001 | A01102 | 1 | B OFFICE |
| 1023001 | B011023001 | | ○○ SHOP |
| B011023003 | A01102 | 1 | B OFFICE |
| 1023003 | B011023003 | | ×× STORE |
| B011053102 | A01105 | 1 | E OFFICE |
| 1053102 | B011053102 | | △△ SHOP |
| B01105△03 | A01105 | 1 | E OFFICE |
| 105△03 | B01105△03 | | ZZ SALES |

FIG.18

TOTALIZATION
FILE

KEY

| 011023001 | B | ○○ SHOP | 200,000 | |
|---|---|---|---|---|
| 011023003 | B | ×× STORE | 400,000 | |
| 011053102 | B | △△ SHOP | 50,000 | |
| 01105△03 | B | ZZ SALES | 12,000 | |
| 01102 | A | B OFFICE | 600,000 | |
| 01105 | A | E OFFICE | 62,000 | |

↓ SORT (CODE ORDER)

| 01102 | A | B OFFICE | 600,000 | |
|---|---|---|---|---|
| 011023001 | B | ○○ SHOP | 200,000 | |
| 011023003 | B | ×× STORE | 400,000 | |
| 01105 | A | E OFFICE | 62,000 | |
| 011053102 | B | △△SHOP | 50,000 | |
| 01105△03 | B | ZZ SALES | 12,000 | |

FIG.19

PRINT IMAGE

| SALES RECORD TABLE | | |
|---|---|---|
| OFFICE | SALES AMOUNT | |
| B OFFICE | 600,000 | |
| ○○ SHOP | 200,000 | |
| ×× STORE | 400,000 | |
| E OFFICE | 62,000 | |
| △△ SHOP | 50,000 | |
| ZZ SALES | 12,000 | |

FIG.20

TABLE A

| SERIAL NO. | TOTALIZATION LEVEL A | TOTALIZATION LEVEL B | TOTALIZATION LEVEL C | OUTPUT ORDER | MANAGEMENT UNIT | COLLECTION FILE | |
|---|---|---|---|---|---|---|---|
| | | | | | | (FIRST DESIGNATION ITEM) OFFICE CODE | (SECOND DESIGNATION ITEM) CUSTOMER CODE |
| 01 | (OFFICE) | | | CODE ORDER | | 10? | |
| 02 | | (CUSTOMER) | | CODE ORDER | ○ | | 3??? |
| 03 | | | | | | | |
| 04 | | | | | | | |

FIG.21

PRINT IMAGE

SALES RECORD TABLE

| OFFICE | SALES AMOUNT | |
|---|---|---|
| B OFFICE 102 | 600,000 | |
| ○○ SHOP 3001 | 200,000 | |
| ×× STORE 3003 | 400,000 | |
| E OFFICE 105 | 50,000 | |
| △△ SHOP 3102 | 50,000 | |

DATA PROCESSING APPARATUS FOR EXTRACTING AND PROCESSING ARBITRARY RECORDS FROM A FILE

BACKGROUND OF THE INVENTION

1. Field of the Invention

The present invention relates to a slip output apparatus which is used for an office computer, a personal computer, and the like, and leads record data from an account file, a personnel file, etc. to output the data in the form of a slip.

2. Description of the Related Art

Conventionally, business machines or office machines like office computers and general-purpose computers, store and manage various types of files such as an account file, personnel file, a sales slip file and a stock file. The record structures of individual files may differ file by file, so that records which have the same record format (records which have the same constituting items) are stored and managed as a separate file.

There may be a case where an arbitrary item is specified to read records having that item from a file, the records are grouped into a slip and this slip is then output. In this case, even if data in the items are first prepared in a classification code system that facilitates classification and totalization, the classification may later become unsuitable for the actual situation then, and slips may not directly be output group by group.

Conventionally, therefore, a code conversion table for classification is typically used to convert the item data to the optimal code system for classification.

With the usage of the code conversion table, however, specialists or system engineers should prepare a classification code system (conversion table). In other words, it requires very professional and special knowledge to prepare classification code systems in accordance with various types of office works demanded. It is therefore very difficult for ordinary users or office workers to prepare such code systems, so that system engineers are normally asked to do this kind of work.

Accordingly, it is a primary object of the present invention to provide a data processing apparatus which groups records that match with a plurality of code conditions into a hierarchical structure as specified to obtain a desired slip by simply designating code conditions indicating the target items in association with a plurality of items at the time of extracting the output level and output records.

As described above, the record structures of individual files differ file by file, so that records which have the same record format (records which have the same constituting items) are stored and managed as a separate file. To specify an arbitrary item to read records having that item from a file and then output them in the form of a slip, the names of output records and the target items should previously be input in one-to-one association with one another while considering the layout like how the records should be arranged.

When there are many records, it is significantly difficult and troublesome to directly input the names of the records and the target items one after another, record by record, and the chance of making mis-entries increases accordingly.

It is therefore another object of this invention to provide a data processing apparatus which, by simple designation of the names and layout positions of output records and the code conditions of target items, will read all the records that match with the code conditions from a predetermined file and will output the records together with the record names in a form as precisely specified, to thereby obtain a desired slip.

SUMMARY OF THE INVENTION

To achieve the objects, there is provided a data processing apparatus comprising:

output record designating means for designating names of output records and designating item data of the output records to be extracted and names of files in association with one another;

output order specifying means for specifying an output order of the output records in association with the record names;

read means for reading records from associated files designated in accordance with the item data designated by the output record designating means;

processing means for processing the records, read by the read means, for each of the record names designated by the output record designating means; and output means for outputting the records processed by the processing means in the order specified by the output order specifying means.

According to this structure, it is possible to group records that match with a plurality of code conditions into a hierarchical structure as specified to obtain a desired slip by simply designating code conditions indicating the target items in association with a plurality of items at the time of extracting the output level and output records. Unlike the prior art, this apparatus is very practical in that anyone will easily obtain desired slips without asking professionals such as system engineers to prepare code systems.

Further, according to the structure, by simply designating the names and layout positions of output records and the code conditions of target items, all the records that match with the code conditions will be read from a predetermined file and will be output together with the record names in a form as precisely specified, thereby providing a desired slip. This apparatus is very practical in that a user will easily obtain desired slips through simple designation, without directly describing the names of output records, record by record, or directly describing an item code for each target item.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a diagram showing a printout example of a slip;

FIG. 3A is a diagram showing the contents of a table A;

FIG. 3B is a diagram showing the contents of a table B;

FIGS. 4A through 4C show a part of a table memory 6, FIG. 4A showing a file recognition table, FIG. 4B showing an office table and FIG. 4C showing a customer table;

FIGS. 9A through 9D specifically illustrate how structure records are prepared, FIGS. 9A and 9C showing structure records, FIG. 9B showing the contents of a last-item work memory and FIG. 9D showing a part of collection file;

FIG. 10 shows specific contents of the structure file;

FIG. 12 is a diagram showing how development records are produced;

FIGS. 14A and 14B specifically show the operation contents of the development/totalization process, FIG. 14A showing how totalization records are produced from the development file and structure file and FIG. 14B showing development records to be newly produced;

FIG. 15 is a diagram showing the contents of a totalization file before and after sorting thereof;

FIG. 16 is a diagram exemplifying the contents of a table A according to a second embodiment;

FIG. 17 is a diagram showing the contents of a structure file according to the second embodiment;

FIG. 18 is a diagram showing the contents of a totalization file before and after sorting thereof according to the second embodiment;

FIG. 19 is a diagram showing a printout example of a slip according to the second embodiment;

FIG. 20 is a diagram exemplifying the contents of a table A according to a third embodiment; and FIG. 21 is a diagram showing an output example of a slip according to the third embodiment.

DETAILED DESCRIPTION OF THE PREFERRED EMBODIMENTS

First Embodiment

A first embodiment will now be described referring to FIGS. 1 through 15.

Figure 1:
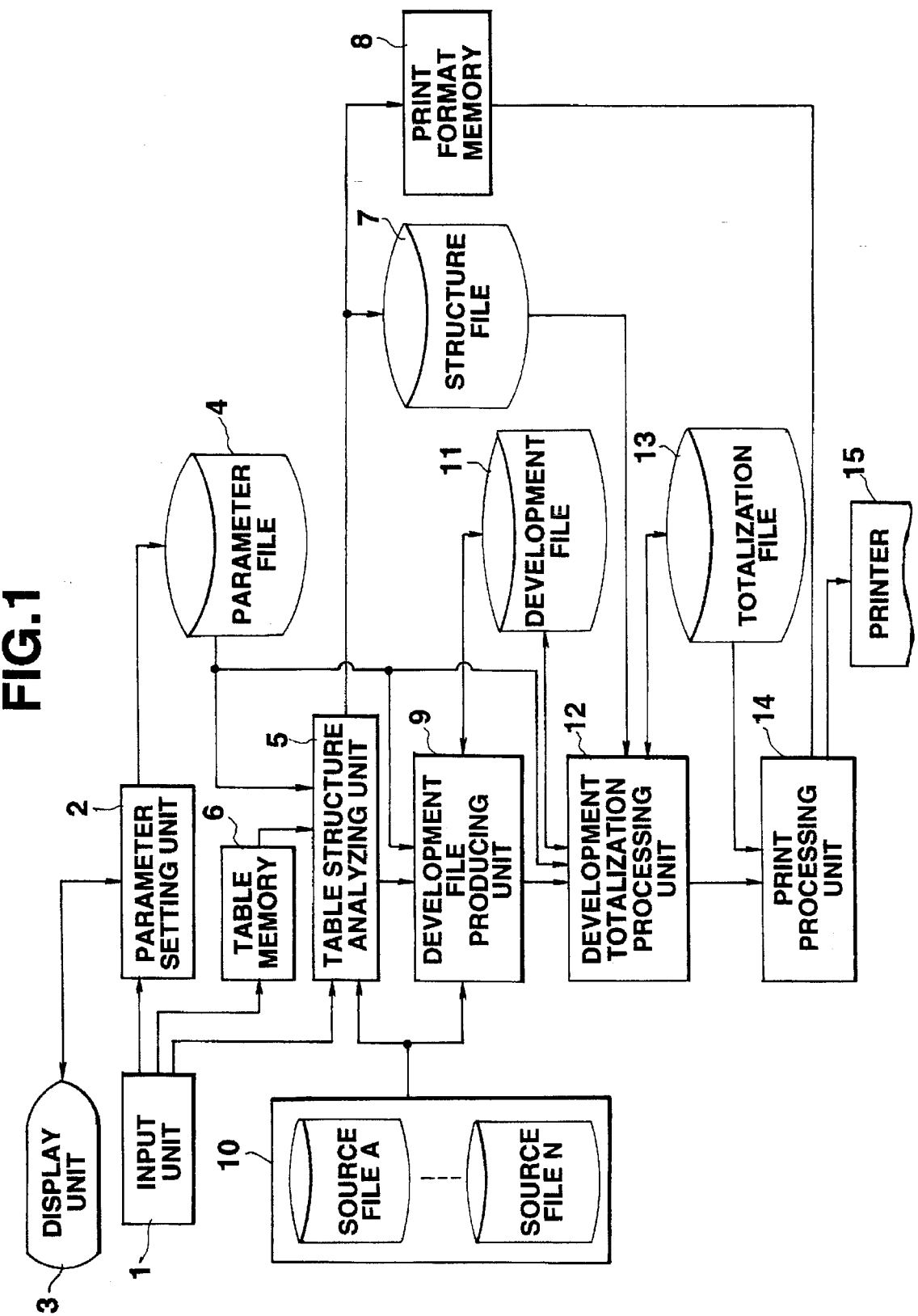
FIG. 1 is a block diagram showing the structure of a data processing apparatus according to one embodiment of the present invention.

FIG. 1 is a block diagram showing the structure of a data processing apparatus according to this embodiment. This data processing apparatus constitutes an office computer, and is designed in such a way that when a clerk or the like who does not have special knowledge merely specifies any desired totalization target for each totalization level using a totalization definition table, this apparatus reads records corresponding to the definitions in the totalization definition table from a predetermined file, totalizes the records group by group with the hierarchical structure according to the totalization level, and prints out the totalization results as slip data.

An input unit 1 is a key input device for inputting various types of data, commands and so forth. The data entered through the input unit 1 is supplied to a parameter setting unit 2 to be processed there as well as is displayed on a display unit 3. An activation command is given to the parameter setting unit 2 in accordance with a predetermined key operation on the input unit 1. In response to the activation command from the input unit 1, the parameter setting unit 2 produces definition tables (two kinds of tables A and B in this embodiment) which define the layout positions of the names of the totalization records and code conditions for the totalization target items, based on the data from the input unit 1, causes the display unit 3 to display the tables, and set them in a parameter file 4 in order for a user to specify the desired records. The tables A and B will be described in detail later.

For example, in printing out a "sales record table" as shown in FIG. 2 as a desired slip, the tables A and B are set as totalization definition tables to output this slip. The slip shown in FIG. 2 has record names of totalization records arranged at the leftmost column row by row and data item names of the totalization records at the topmost row column by column. The tables A and B which are defined to obtain this slip are structured as shown in FIGS. 3A and 3B, respectively.

The table A defines the layout positions of record names of the totalization records in accordance with the totalization level and the code conditions indicating the target items at the time of extracting output records, besides file names targeted for totalization. More specifically, in the illustrated example, a "collection file" is specified as a totalization target file name, and "office" is described in parentheses as a general name for actual record names, such OO office and XX office, indicating that an index table (to be described later) should be referred to. The layout positions are specified by defining the "office" in a totalization level A and "customer" in a totalization level B. The description method is in no way fixed, and the layout positions may be specified by marking circles or the like in association with the record names. In this embodiment, general names are used and described in parentheses to indicate that the names are general or representative names. If such general names are not used, particular names should be described without parentheses.

As a code condition indicating a target item at the time of extracting totalization records, for example, "10?" is specified. This code condition "10?" consists of a three-digit numeral code, and indicates that item codes having the upper two digits fixed to "10" with any value available for the lower one digit, are totalization target items. The mark "?" may be put in any digit position, or the numeral code may be given fully to designate only a single item code.

The table B defines item names to be output as data items of the totalization records and totalization target items which will be extracted as the format, a totalization target file and data items in association with the item names at the time a slip is printed out.

The parameter file 4 has basic formats (lines, data, etc.) fixedly stored in advance in association with the tables A and B by a manufacturer. Further stored in the parameter file 4 are table-A parameter data and table-B parameter data of various types of slips, input arbitrarily from the input unit 1, and a correlation table which correlates various slip names, input arbitrarily from the input unit 1, with the table-A parameter data and table-B parameter data.

In response to an activation command input from the input unit 1 at the time of printing a slip, a table structure analyzing unit 5 analyzes the table-A parameter data and table-B parameter data associated with the arbitrarily designated slip name as an output target, and prepares a structure file 7 according to the analyzing results. A table memory 6 stores index tables or the like, which correlate the item codes with names. The index tables are arbitrarily set by a user through the input unit 1. The table structure analyzing unit 5 refers to this table memory 6 and prepares the structure file 7 while reading names corresponding to all the item codes which match with the code conditions in the table A.

FIG. 4 shows a part of tables set in the table memory 6. A file recognition table is provided for each file and has file item names in association with the names of the index tables. The illustrated file recognition table corresponds to the collection file. An office table and a customer table are index tables corresponding to the illustrated file recognition table, and have item codes associated with the names. Names corresponding to the item codes are read out from the index tables to automatically produce the names.

The structure file 7, which will be discussed in detail later, consists of various structure records which represent the correlation between the item codes to be totalized and their totalization records or the parent-sub relation (level relation) in the hierarchical structure of the totalization level.

Further, the table structure analyzing unit 5 reads the item names in each column defined at the header position in the table B, e.g., "sales amount," and sets it in a print format memory 8. The table structure analyzing unit 5 also reads the print format in each column defined at the format position in the table B and sets it in the print format memory 8. Thereafter, the table structure analyzing unit 5 sends an activation command to an development file producing unit 9.

The development file producing unit 9 refers to the contents of various tables in the table memory 6 to designate a totalization target file from various source files A to N constituting a data file 10, or sequentially produce development records one by one based on the records read from the totalization target file and write the records in an development file 11. When the development file 11 is prepared, the development file producing unit 9 gives an activation command to a development totalization processing unit 12.

The development totalization processing unit 12 sequentially prepares totalization records one by one based on the contents of the development file 11 and writes the records in a totalization file 13, referring to the structure file 7. After preparing the totalization file 13, the development totalization processing unit 12 sends an activation command to a print processing unit 14.

The print processing unit 14 prints out the contents of the totalization file 13 record by record, together with the slip format from a printer 15, in accordance with the print format set in the print format memory 8, thus yielding a slip.

The operation of this embodiment will now be described.

When the production of the tables A and B is instructed through the input unit 1 to obtain a desired slip, the parameter setting unit 2 is activated. First, in producing the table A, the parameter setting unit 2 displays a table frame, etc. according to the basic format for the table A read from the parameter file 4. Under this condition, parameter data for the table A is input from the input unit 1. FIG. 3A shows a display example when parameter data is input to the table A. In this example, general names in place of actual record names are written in parentheses in the row direction to specify the layout positions of record names of the totalization records in association with the totalization levels A, B and C. For instance, "(office)" is input in the row No. "01" in association with the totalization level A and "(customer)" is input in the row No. "02" in association with the totalization level B. The totalization levels have a hierarchical structure of A>B>C, so that if the layout positions of the record names are defined in accordance with the totalization levels, records will be totalized with the hierarchical structure according to the totalization levels. For example, records of the totalization level B will be totalized in the records in the totalization level A which is higher than the totalization level B.

Arbitrary files names and item names are stored in the table A. For example, the file name "collection file" is input in the table A shown in FIG. 3A, defining the target file from which the totalization records should be read out. A first designation item and a second designation item are input as item names corresponding to the file name. For example, the item name, "office code," is input as the first designation item and the item name, "customer code," is input as the second designation item, whereby the target item names to be extracted are defined as totalization records. In association with those two item names, code conditions for the totalization target items are input in the table A. More specifically, the code condition "10?" is input in the row No. "01" in association with the first designation item and the code condition "3???" is input in the row No. "02" in association with the second designation item. This code condition "10?" consists of a three-digit numeral code, and indicates that all the item codes having the upper two digits of "10" are totalization target items. This code condition "3???" consists of a four-digit numeral code, and indicates that all the item codes having the upper one digit of "3" are totalization target items. In this manner, the code conditions are defined in the table A in association with a plurality of item names. In this case, the records associated with a plurality of code conditions are to be totalized. That is, the totalization targets are all the records which have a value of "10" at the upper two digits in the office code and a value of "3" at the upper one digit in the customer code. Although the code condition for the first designation item is defined in the row No. "01" in the illustrated example to clarify the hierarchical relation, the code condition may be defined in the row No. "02" as well.

An output order area is provided in the table A for each row number. The "output order" defines in what order the contents of the records matching with the code conditions are to be output. In the illustrated example, "code order" is input as the output order for the row Nos. "01" and "02," indicating that the records are to be output in an ascending order. In the case where there are records having the item code of "102" and item code of "105" which correspond to the code condition for the office code, for example, this "code order" defines that the records having the item code of "102" are output first followed by the records having the item code of "10." The "output order" may be a name order, a reverse order, etc. besides the code order. The table A further has a management unit area for each row, so that a circle is to be marked in this area in any row specified. This management unit will be referred to at the time the structure file 7 is prepared.

After producing the table A in this manner, the parameter setting unit 2 sets the parameter data in the parameter file 4.

Then, the parameter setting unit 2 reads the basic format for the table B from the parameter file 4 and displays it. In the index column, "format," "target file" and "totalization item" are fixedly set in advance as labels of the rows. The items in the individual columns in the table B are associated with "A," "B," "C," and so forth as names to indicate the item positions.

With the basic format for the table B displayed, a user inputs parameter data for the table B from the input unit 1. FIG. 3B shows an display example when the parameter data is input to the table B. Item names to be printed out as data items of the totalization records are input in the index portion in the column direction in the table B. For example, the item name "sales amount" is input at the item position "B." In the row items in the table B, the column width, character type, character size, etc. are input column by column in "format" as the print format of the item data. In the next "target file," "collection file" is input in association with the column position "B." The next "totalization item" defines which item data from the records, read as totalization targets, should be totalized; "sales amount" is input in association with the column position "B."

After producing the table B in this manner, the parameter setting unit 2 sets the parameter data in the parameter file 4.

When the user specifies an arbitrary slip name and sends a print instruction through the input unit 1 after the production of the tables A and B, the table structure analyzing unit 5 produces the structure file 7 in accordance with the parameters in the table A. FIGS. 5 through 8 are flowcharts illustrating the operation for producing the structure file 7, FIG. 9 shows the operation contents at the time of producing the structure file 7, and FIG. 10 shows specific contents of the structure file 7 produced based on the table A shown in FIG. 3A. The structure record includes "sub-code," "parent code," "end mark" and "name." The "sub-code" and "parent code" represent the correlation between the totalization target items and the associated totalization records, or the parent-sub relation (level relation) in the hierarchical structure of the totalization levels. The "end mark" is a flag which is set to "1" when the parent code includes the highest totalization level A. With "1" set to the end mark, record totalization to an upper level will not be executed. The "name" indicates the name of a totalization record, which is automatically generated by referring to the index tables or the like in the table memory 6.

First, the table structure analyzing unit 5 reads the parameter data for the table A from the parameter file 4 and specifies source files in the data file 10 which are indicated by the file names defined in the table A (step A1). Then, the top row of the table A is designated (step A2), the contents of a last-item work memory (see FIG. 9B) in the table structure analyzing unit 5 are all cleared (step A3), and the level of the specified level is designated as the current level of interest (current level) (step A4). The last-item work memory will be described later.

Then, records having item codes that corresponds to the code condition in the first designation item defined in the table A are retrieved from the designated file (step A5). As "collection file" is defined as a file name and "10?" is defined as the code condition for the first designation item (item name "office code") in the table A, the records with office codes having upper two digits of "10" are retrieved from the collection file. In this example, the collection file has a structure as shown in FIG. 9D. Supposing that records having office codes of "112," "102," "102," "105," "105," "125,". . . are stored in order from the top in the collection file, then the second record which has the office code "102" is retained first from the collection file as the one which matches with the code condition for the first designation item.

Then, level row data is produced from the current level, the row number in the table A currently of interest, and the item code in the associated record (step A6). As the first row in the table A is now of interest, the current level is "A," the row number is "01" and the item code in the associated record is "102." Accordingly, level row data "A01102" which is a combination of those three is generated. Next, the name corresponding to the item code is read out from the associated index table in the table memory 6 (step A7). More specifically, the file recognition table in the table memory 6 which corresponds to the file name defined in the table A is accessed to read the table name corresponding to the item name for the first designation item, and the index table corresponding to this table name is accessed to read the name corresponding to the item code therefrom. In this case, the name "B office" corresponding to the item code "102" is read from the office table.

Then, the generated level row data and the name read from the index table are set at the current level position in the last-item work memory (step A8). As a result, the level row data "A01102" and the name "B office" are set at the position of the current level A in the last-item work memory, as shown in FIG. 9B. The last-item work memory is designed to store the level row data and names in association with the totalization levels A, B, C, D, . . . as shown in FIG. 9B.

Next, it is checked if a circle is marked in the management unit area at the current row (step A9). As no circle is marked in the first row in the table A, the row of interest moves to the next row in the table A and it is checked if data is set in that row (step A10). If data is detected in that row, the current row is updated to specify the next row (step A11). Consequently, the second row in the table A is designated, and the flow then advances to step A12 where it is checked if the level in the designated row is equal to or higher than the current level (error check). If the former level is equal to or higher than the current level, the memory contents below the level of the designated row in the last-item work memory are all cleared (step A13). Since the designated row level B is lower than the current level A, the flow goes to step A14 to update the designated row level as the current level.

Figure 6:
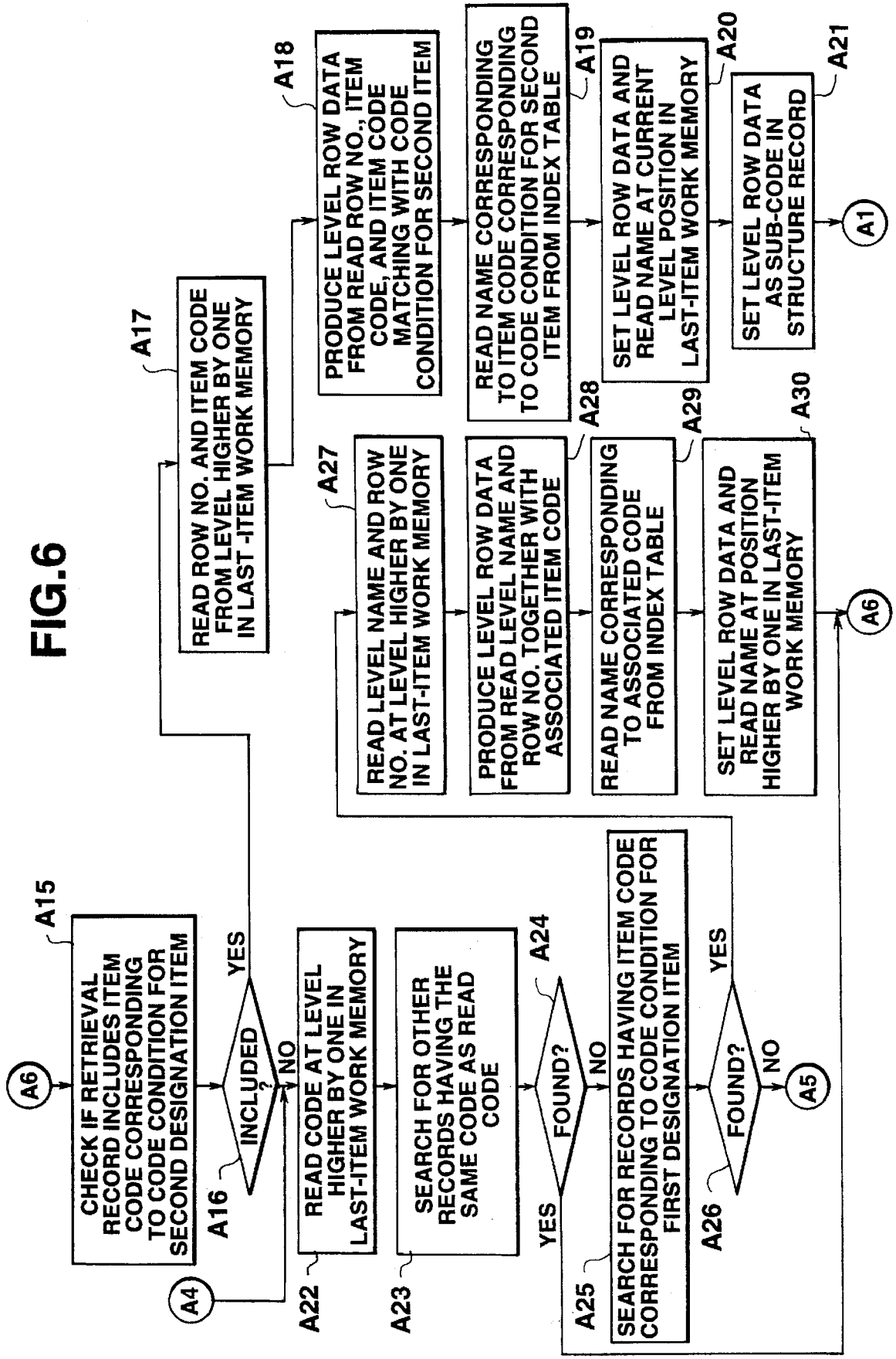
FIG. 6 is a flowchart illustrating a continuation part of the structure file producing process shown in FIG. 5.

Next, the flow moves to step A15 in FIG. 6 where it is checked if the retrieved record (the record which has been retrieved in step A5 based on the code condition for the first designation item) includes the item code that corresponds to the code condition for the second designation item defined in the table A. The code condition for the second designation item (item name "customer code") is "3???," the retrieved record is the second record shown in FIG. 9D or the record which has the office code "102" and the customer code "3001" in the second retrieved record matches with the code condition "3???." The inclusion of the item code corresponding to the code condition is therefore detected in step A16, and the flow moves to step A17. In this step A17, the row No. "01" and the item code "102" are read from the level row data stored at the level position higher by one than the current level B (i.e., the position of the totalization level A) in the last-item work memory. Then, the current level B, the row No. "01" and the item code "102" read from the last-item work memory and the item code "3001" which matches with the code condition for the second designation item are combined in the named order to yield level row data "B011023001" (step A18). Based on the item code "3001" which corresponds to the code condition for the second designation item, the associated name "OO shop" is read from the associated index table (customer table) (step A19), and this name is set together with the level row data, produced in step A18, at the level position corresponding to the current level in the last-item work memory (step A20). Consequently, the level row data "B011023001" and the name "OO shop" are set at the position of the level B in the last-item work memory (see FIG. 9B). In the next step A21, this level row data is set as a sub-code in the structure record (see FIG. 9A).

Figure 7:
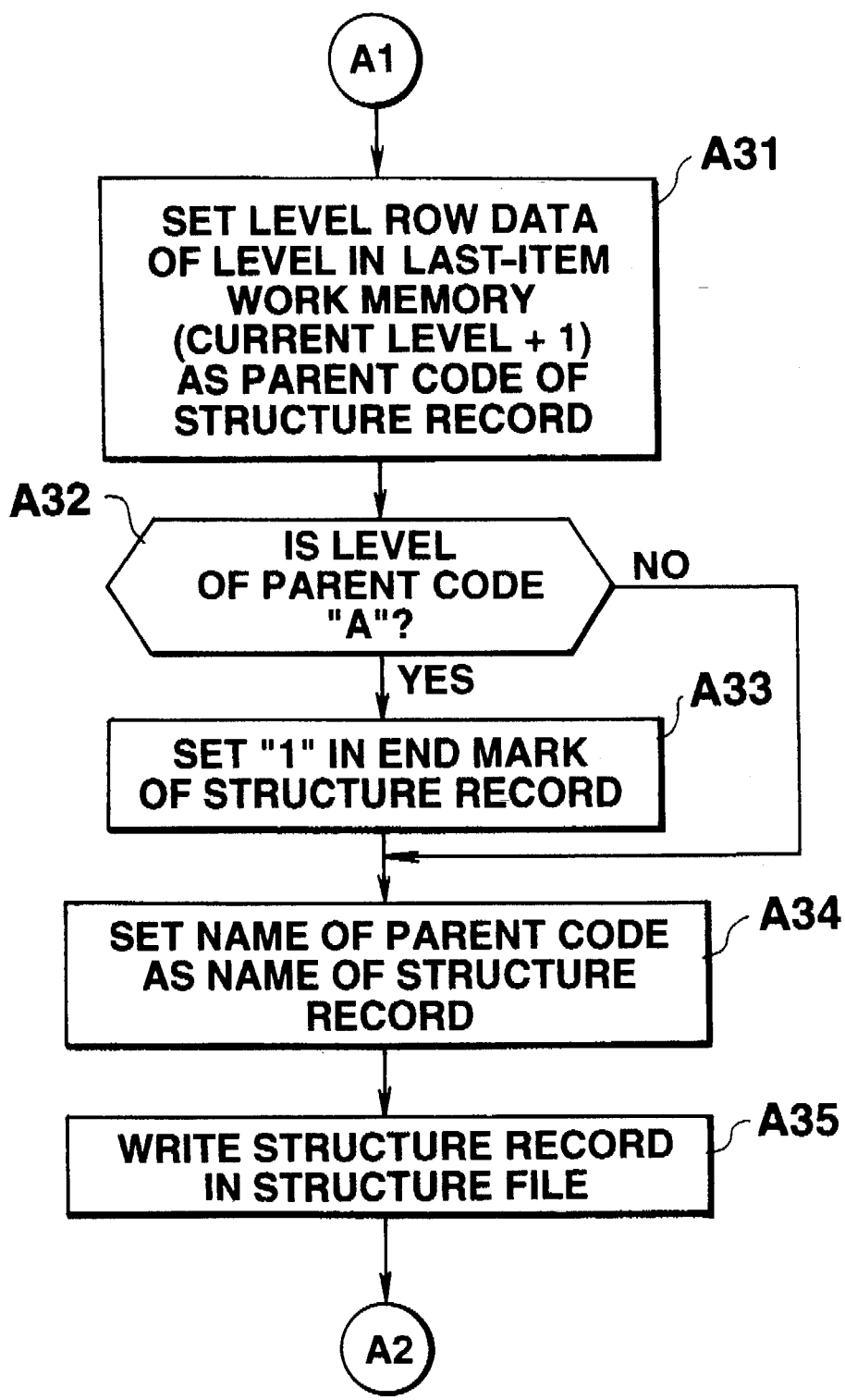
FIG. 7 is a flowchart illustrating a continuation part of the structure file producing process shown in FIG. 5.

The flow then proceeds to step A31 in FIG. 7 where level row data stored at the level position of (current level+1) is read from the last-item work memory and is set as a parent code in the constituting codes. As the current level is B, level row data "A01102" stored at the position of the level A in the last-item work memory becomes a parent code (see FIG. 9A). If the level of the parent code is A (step A33), "1" is set to the end mark in the structure record (step A34). Next, the name of the parent code is read from the last-item work memory and set as the name of the structure record (step A35). When the sub-code "B011023001," parent code "A01102," end mark "1" and name "B office" are obtained as one record of data in this manner, this structure record is written out as first record of data in the structure file 7 as shown in FIG. 10 (step A36).

Figure 5:
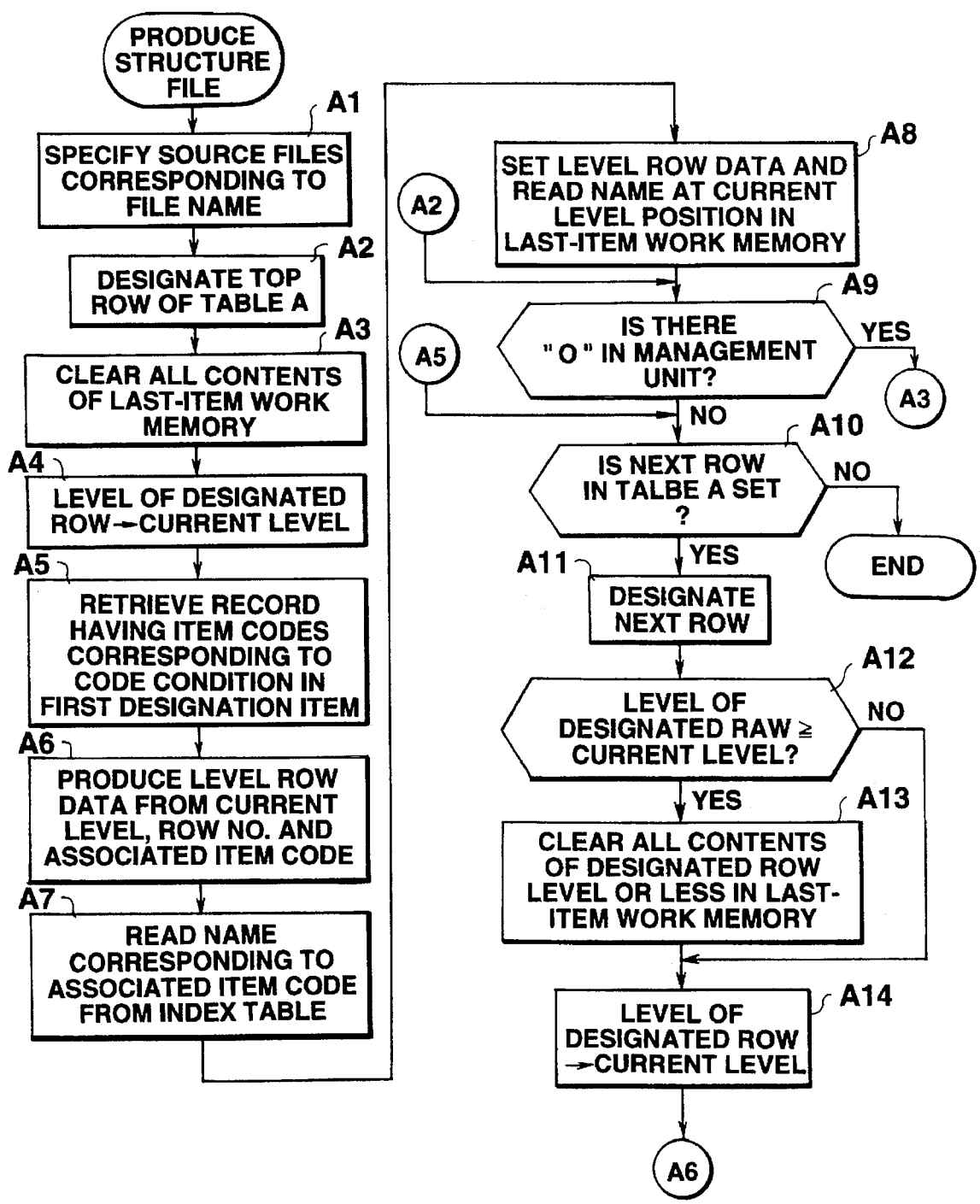
FIG. 5 is a detailed flowchart of a part of a process producing a structure file.

When the structure record for the first record is produced this way, the flow then returns to step A9 in FIG. 5. In this case, as a circle is put in the management unit area corresponding to the current row or the row No. "02," the flow goes to step A36 in FIG. 8. In this step A36, the item code "102" corresponding to the code condition for the first designation item and the item code "3001" corresponding to the code condition for the second designation item are read from the level row data stored at the current level position in the last-item work memory and their combined code is set as a sub-code in the next structure record (see FIG. 9C). Then, the level row data "B011023001" stored at the current level position in the last-item work memory is read out to be set as a parent code in the structure record (step A37). Then, the name of this parent code is read out from the last-item work memory to be set as the name of the structure record (step A38). FIG. 9C shows the thus produced structure record, which includes the sub-code "1023001," the parent code "B011023001" and the name "OO shop" and is written as the second record of data in the structure file 7 (step A39).

After the structure record of the second record is produced in this manner, the flow goes to step A22 in FIG. 6 where the item code "102" is read from the level row data stored at the level position higher by one than the current level in the last-item work memory. Then the source file is searched for other records having the same code as this item code (step A23). As the office code of the third record in the collection file is also "102" as shown in FIG. 9D, a record having the same code is detected in step A24 and the flow returns to step A15. In this case, the customer code is "3003," which matches with the code condition "3???" for the second designation item, so that a structure record will be produced based on the retrieved record in the same manner described above. More specifically, level row data "B011023003" is produced from the row No. "01," the item code "102," the current level B and the item code "3003" for the second designation item, all read from the level position higher by one than the current level in the last-item work memory (steps A17 and A18), the name "XX store" corresponding to the item code "3003" is read from the customer table (step A19), and this level row data and the name are set at the current level position in the last-item work memory (step A20). As a result, the memory contents at the position of the level B in the last-item work memory as shown in FIG. 9B are rewritten and this level row data and the name respectively become "B011023003" and "XX store." This level row data is then set as a sub-code in the structure record (step A21). Next, the level row data "A01102" read from the position of the level A in the last-item work memory is set as a parent code in the structure record (step A31), "1" is set to the end mark in the structure record (step A33), and the name of the parent code, "B office," is set as the name of the structure record (step A34). The resultant structure record is written as the third record in the structure file 7 (see FIG. 10).

Figure 8:
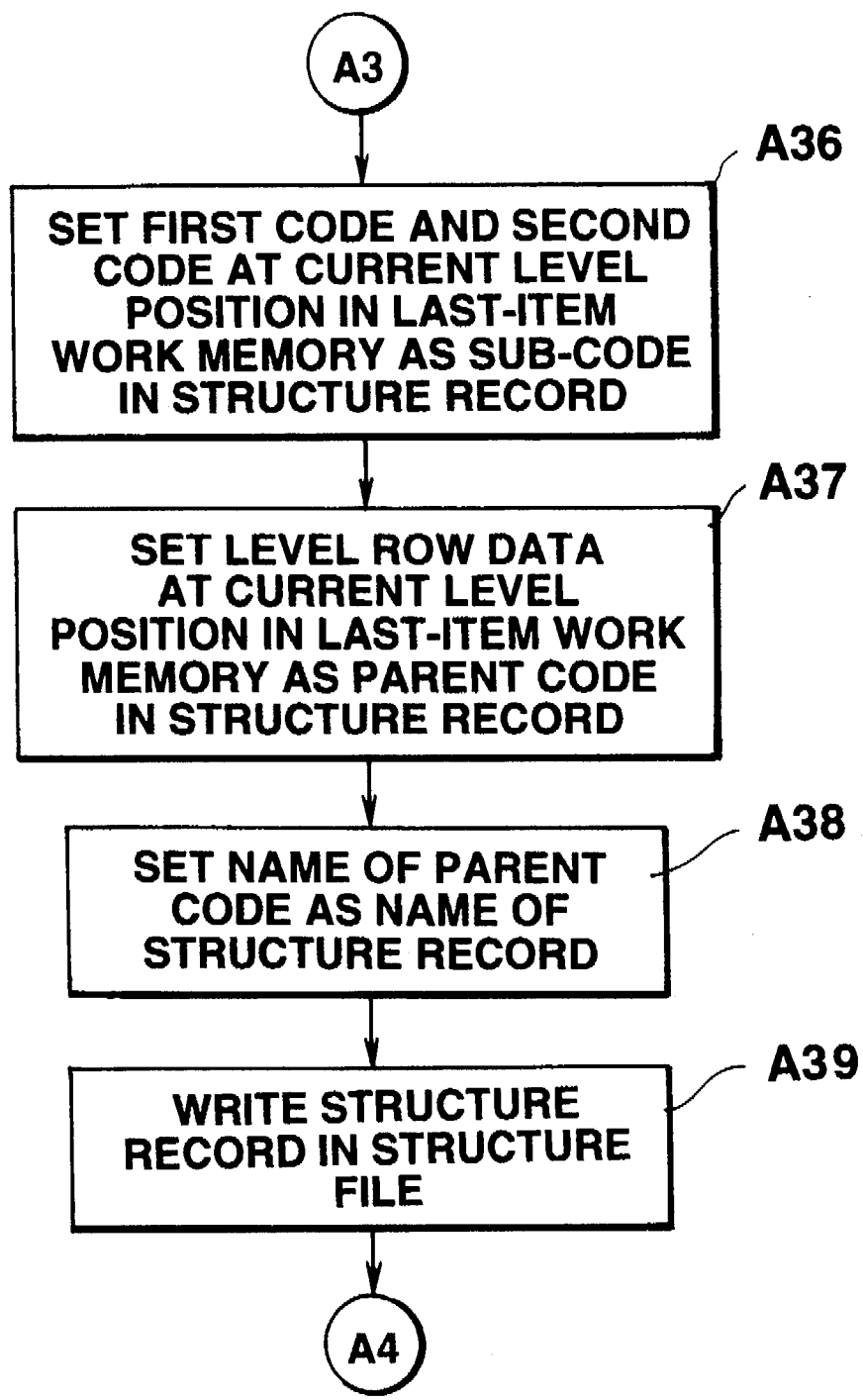
FIG. 8 is a flowchart illustrating a continuation part of the structure file producing process shown in FIG. 5.

The flow then returns to step A9 in which case a circle in the management unit area is also detected, so that steps A36 to A39 in FIG. 8 will be executed. Consequently, the structure record of the fourth record as shown in FIG. 10 is produced. In this case, the sub-code is "1023003," the parent code is "B011023003" and the name is "XX store."

The flow then returns to step A22 in FIG. 6 in which case no other records having the office code "102" are present in the collection file as shown in FIG. 9D. The flow therefore moves to step A25 where the collection file is searched for other item codes corresponding to the code condition "10?" for the first designation item. In this case, since the fourth record in the collection file has the office code "105" that corresponds to this code condition as shown in FIG. 9D, the existence of the corresponding code is detected in step A26 and the flow then moves to step A27. In this the level name and the row number are read from the level row data stored at the level position higher by one than the current level in the last-item work memory. Based on the level name and row number together with the item code corresponding to the code condition for the first designation item, level row data is produced (step A28). In this case, "A01105" is produced as level row data. Then, based on the item code "105" corresponding to the first designation item, the associated name "E office" is read from the index table (step A29) and is set together with the level row data at the level position higher by one than the current level in the last-item work memory (step A30). As a result, the memory contents at the position of the level A in the last-item work memory as shown in FIG. 9B are rewritten and this level row data and the name respectively become "A01105" and "E office."

The flow then returns to step A15 in which case the customer code in the fourth record in the collection file is "3102." As this code corresponds to the code condition "3???" for the second designation item, a structure record is produced based on this record (steps A17–A21 and A31–A35). The structure record of the fifth record thus produced has the sub-code "B011053102," the parent code "A01105," the end mark "1" and the name "E office" as shown in FIG. 10.

The process of producing a structure record will be repeated record by record until no setting detected in the next row in the table A in step A10. Accordingly, the structure file 7 as shown in FIG. 10 is produced.

After producing the structure file 7, the table structure analyzing unit 5 reads table-B parameter data from the parameter file 4, and reads format data from the parameter data and sets it in the print format memory 8. In this case, the table structure analyzing unit 5 reads item names in each column defined at the header position in the table B and sets them in the print format memory 8. Thereafter, the table structure analyzing unit 5 activates the development file producing unit 9.

Figure 11:
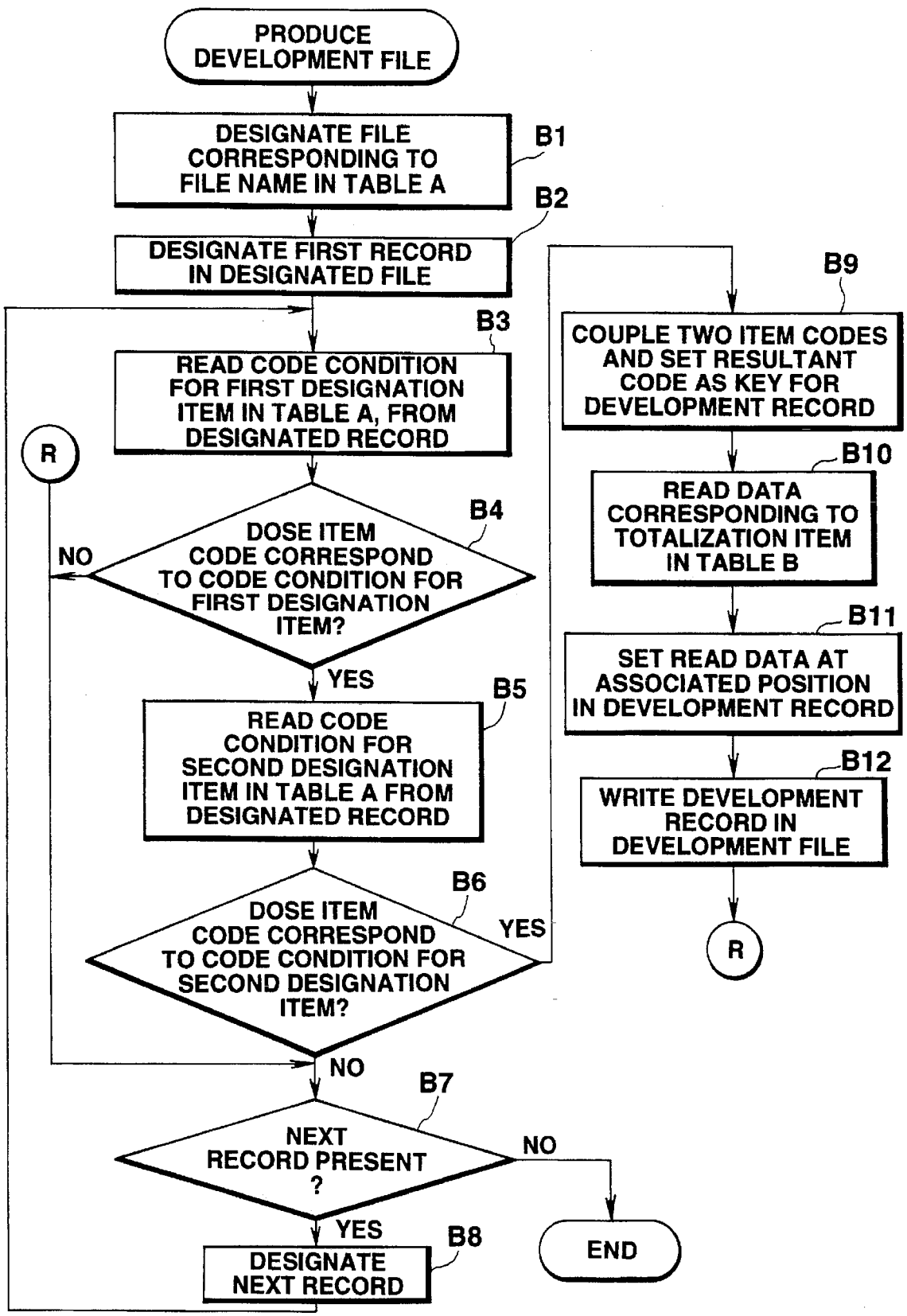
FIG. 11 is a flowchart illustrating a process of producing a development file.

The development file producing unit 9 then performs a development file producing process according to the flowchart given in FIG. 11. The development file 11 is a temporary file produced until the totalization file 13 or the output data of the slip is produced. FIG. 12 shows a development record produced according to the contents of the source file when this source file is a collection file.

First, the development file producing unit 9 designates the source file corresponding to a file name defined in the table A in the parameter file 4 (step B1), and designates the first record in the designated file (step B2). The development file producing unit 9 then reads the item code, corresponding to the first designation item defined in the table A, from the designated record (step B3) and checks if the item code corresponds to the code condition (step B4). As the first record in the collection file has been designated, the item code "112" corresponding to the first designation item "office code" is read out. Since this item code does not correspond to the code condition "10?," the flow moves to step B7 where it is checked if a next record is present in the designated file. When the next record exists, this next record is designated in step B8 before returning to step B3.

As a result, the second record in the collection file is designated and the office code "102" is read out. As this office code corresponds to the code condition for the first designation item, the flow moves to step B5 where the item code corresponding to the second designation item in the table A is read out from the designated record. It is then checked if the item code corresponds to the code condition (step B6). Since the second designation item is a "customer code" and its item code "3001" corresponds to the code condition "3???," the flow goes to step B9 where the item codes "102" and "3001" corresponding to the first and second designation items are coupled and the resultant code is set as a group key for the development record. Then, item data corresponding to the totalization item in the table B is read out from the designated record (step B10) and is set at the associated position in the development record (step B11). As "sales amount" is defined at the item position in the column B as the totalization item in the table B, the sales amount "200,000" is read out from the second record in the collection file and is set to the associated position B in the development record. The development record thus produced is written in the first record in the development file 11 (step B12).

Next, the flow returns to step B7 after which the third record in the designated file is specified. Since this record also corresponds to the code conditions for the first and second designation items defined in the table A, a development record is produced based on that record. The development record in this case becomes the contents of the second record shown in FIG. 12. For the fourth record in the designated file, a development record is likewise produced based on that record and becomes the contents of the third record shown in FIG. 12.

The above-described operation will be repeated thereafter for all the records in the designated file to produce development records one by one. After producing the development file 11, the development file producing unit 9 activates the development totalization processing unit 12.

Figure 13:
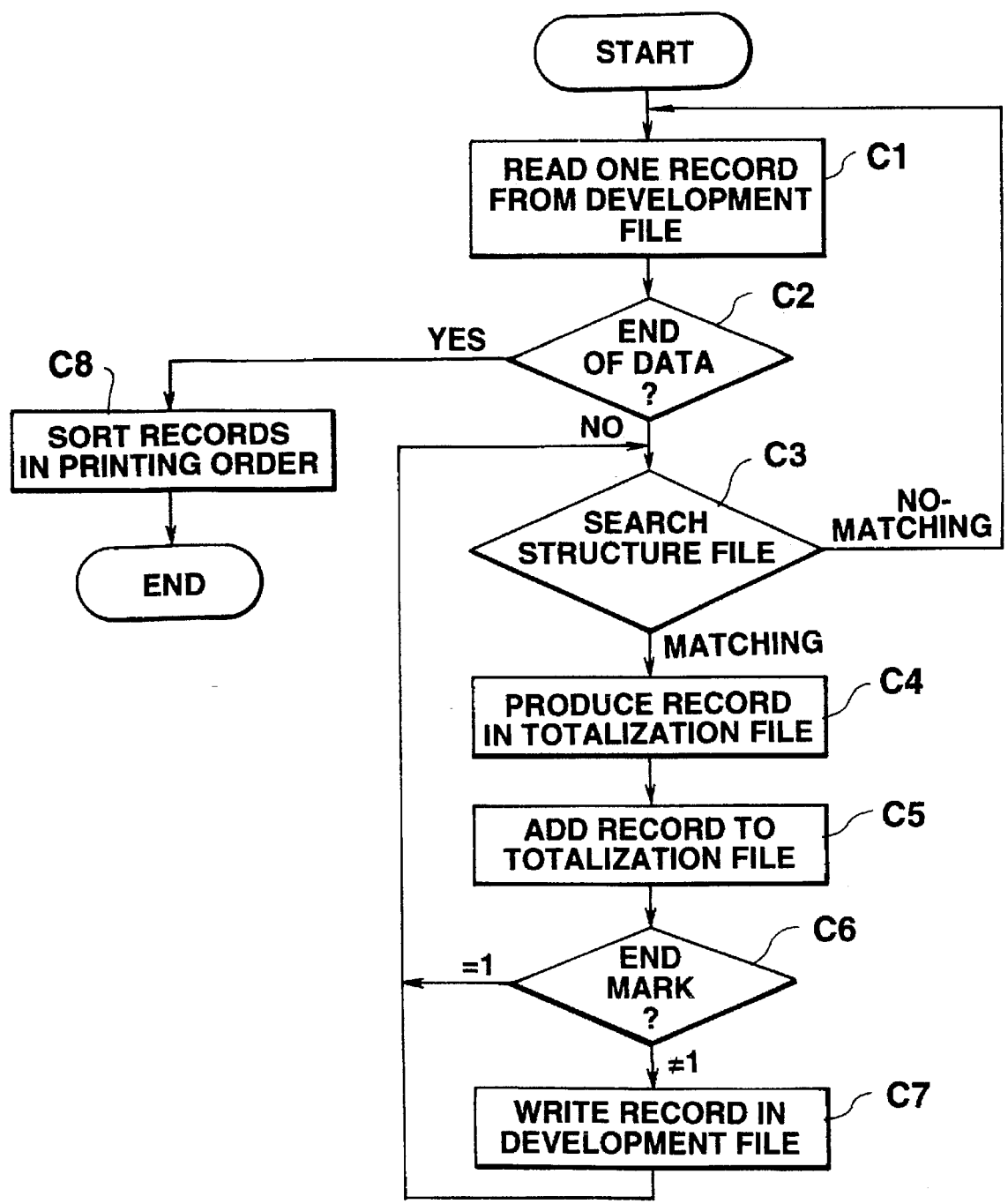
FIG. 13 is a flowchart illustrating a development/totalization process.

FIG. 13 is a flowchart illustrating the operation of the development totalization processing unit 12 and FIG. 14 is a diagram for specifically explaining the operation contents of the development totalization processing unit 12.

Based on the contents of the development file 11 and the contents of the structure file 7, the development file producing unit 9 produces the totalization file 13 according to a development scheme.

First, the development totalization processing unit 12 reads one record of data from the top of the development file 11 (step C1). In the next step C2, the development totalization processing unit 12 checks if there is no more data or if all the records from the top of the development file 11 have been read. As one record of data is read from the top of the development file 11 at the beginning of this process, the flow moves to the next step C3 to search the structure file 7 for a sub-code matching with the group key. The group key in the first record in the development file 11 is "1023001" as shown in FIG. 12 and a structure record having a sub-code matching with this group key exists in the second record of the structure file 7 as shown in FIG. 10. Thus, the matching sub-code is detected in step C3 and the flow moves to step C4 to produce a record (totalization record) in the totalization file 13. In a specific example given in FIG. 14, the development totalization processing unit 12 first reads a parent code corresponding to the sub-code "1023001" from the structure file 7, breaks this parent code "B011023001" to the totalization level and the remaining numeral, arranges this numeral "011023001" in the first item in the first record in the totalization file 13 and places tie totalization level "B" following that numeral. Then, the development totalization processing unit 12 reads the name "OO shop" corresponding to this sub-code from the structure file 7 and places it in the item next to the totalization record. The data item "200,000" in the development file 11 is then placed at the next item in the totalization record.

When the first record of data of the totalization file 13 is produced accordingly, this produced record is written in the totalization file 13. At this time, if there already is any record having the same group key, those records are grouped into one record which is in turn written in the totalization file 13. If there is no record having the same group key, on the other hand, the record currently produced is newly added to the totalization file 13 (step C5).

Then, it is checked if the end mark is set at the corresponding record position in the structure file 7 (step C6). The end mark in the structure file 7 is "1" when the totalization level of the parent code is "A." When the end mark is "1," the flow returns directly to step C3. If the end mark is not "1," a new development record is to be produced and written in the development file 11 (step C7). In this case, the end mark is not set at the corresponding record position in the structure file 7, so that a new development record as shown in FIG. 14 is produced and is returned to the development file 11. That is, if a record at a higher level than the currently produced totalization record is defined in the table A, a new development record is produced and is sent to the printer 15 to totalize the totalization result of the currently produced totalization record in the upper-level record. Here, a record in which the associated parent code "B011023001" in the structure file 7 is arranged at the first item and item data read from the development file 11 is arranged at the subsequent corresponding position, is written in the development file 11.

Then, the flow returns to step C3 and the above-described operation will be repeated until the structure file 7 is completely searched and no further corresponding record is found. When no further corresponding record is detected in step C3 or no-matching is detected, the flow returns to step C1 to read the next record from the development file 11. This operation is executed for all the records in the development file 11. When data end is detected in step C1, the flow moves to step C8 where the individual records constituting the totalization file 13 are sorted according to the key contents at the first item of each record. In this case, the development totalization processing unit 12 sorts the contents of the totalization file 13 according to the output order defined in the table A in the parameter file 4.

FIG. 15 shows the contents of the totalization file 13 before and after sorting thereof. The "output order" defined in the table A is the "code order" for both the "office" and "customer," the associated records in the totalization file 13 are sorted in the ascending order (code order) according to the key contents and becomes as shown in lower figure. Then, the development totalization processing unit 12 activates the print processing unit 14.

The print processing unit 14 reads the contents of the print format memory 8 and causes the printer 15 to print out the contents of the totalization file 13 together with the slip format according to the print format, thereby preparing a slip. In this case, the print processing unit 14 reads the totalization records one after another from the totalization file 13 from the top, discriminates the totalization level included in each totalization record, prints out the name and data in the totalization records record by record together with the associated line format, and sequentially reads the individual item names from the print format memory 8 and prints them at the corresponding positions in the line format. FIG. 2 shows an example of a slip printout in this case; the hierarchical format according to the totalization levels and the names of the totalization records are printed out in the row direction and the item names of the totalization records are printed in the column direction with the contents of the totalization file 13 printed out record by record.

According to this embodiment, as described above, even if many item codes are collectively designated by defining the target items at the time of extracting totalization records by a code condition, the names of all the records which match with the code condition are automatically read from the associated index tables and are output at the record-name layout positions previously defined. It is therefore unnecessary to describe the names of the totalization records record by record, so that the description will be significantly simplified and the whole totalization becomes easier to see, thus reducing the possibility of descriptive errors. To designate many item codes as totalization targets, it is unnecessary to directly describe the contents of the item codes one by one in the output order. Even if those item codes are collectively designated by the description of the code condition, all the records matching with this code condition are output in the output order previously defined, thus further simplifying the description of the totalization definition table.

When a plurality of code conditions are defined in the hierarchical structure according to the totalization levels, all the records corresponding to the code conditions are grouped and totalized according to the totalization levels and the totalization results are output in the hierarchical structure. This eliminates the need for the preparation of code systems (code conversion tables) for grouping and totalization in advance by specialists, such as system engineers, and allows anybody to obtain a desired slip by merely describing a simple totalization definition table.

Second Embodiment

A second embodiment will be described below with reference to FIGS. 16 to 19.

FIG. 16 shows a table A in this embodiment in which the defined contents corresponding to the row Nos. "01" and "02" are the same as those in the first embodiment, but an arbitrary record name of a totalization record is directly described in the row No. "03" according to the totalization level and the code contents of the target items for extracting a totalization record are directly defined in association with the first and second designation items.

That is, this embodiment is designed so that those items which do not correspond to the code conditions for the first and second designation items in the first embodiment can also be totalization targets. In the illustrated example, the item which corresponds to the code condition "10?" for the first designation item but does not correspond to the code condition "3???" for the second designation item, i.e., the item having "105" as the code content for the first designation item and "2001" as the code content for the second designation item is defined as a totalization target. Although the record name "ZZ sales" is directly described in the row No. "03" in association with the totalization level B, this name is an actual name, not a general name as in the first embodiment, so that it need not be described in parentheses. Even when the description for collectively designating a plurality of totalization target items and the description for individually designating the totalization targets are mixed in the table, this embodiment will execute record totalization according to the definition and will print out a slip in a defined image.

FIG. 17 shows the contents of the structure file 7 prepared based on the table A shown in FIG. 16. The seventh record and eighth record in the structure file 7 are newly produced structure records in this embodiment, and the other records are the same as those in the first embodiment. The new structure records are characterized in the form of the sub-code and parent code which includes a delta symbol. More specifically, while the sub-code in the seventh record and the parent code in the eight record should be "B011052001," they are expressed as "B01105A03." Further, while the sub-code in the eighth record should be "1052001," it is actually expressed as "105A03." The numeral "03" following the delta symbol indicates the row number. The delta symbol is used in place of the code content "2001" for the second designation item to put the exceptional record "ZZ sales" on the bottom line at the time of outputting the slip. The contents of the totalization file 13 prepared according to the contents of this structure file 7 are sorted in the output order defined in the table A, referring to the parent codes (excluding the totalization level) of the structure records as keys, and are rearranged in the print order at the time of slip printout. If the code content of the second designation item is directly included in the key in an exceptional record, this record will not be placed on the bottom line. To overcome this shortcoming, this embodiment uses the delta symbol in place of the code content of the second designation item. In sorting the contents of the totalization file 13 in the code order (ascending order), the sorting will be executed in the order of 0 to 9, A to Z, a to Z and A.

FIG. 18 shows the contents of the totalization file 13 before and after sorting, indicating that even if an exceptional record is included in a middle in the totalization file 13, the record after sorting in the code order will come at the bottom line. The sorted contents of the totalization file 13, when printed out, become a slip as shown in FIG. 19 which has the totalization result for the "ZZ sales" on the bottom line in the image as defined.

The reason why the row number follows the delta symbol in the structure record is that when a plurality of exceptional records are defined, they will be printed out in the defined order.

This embodiment has the same advantages as the first embodiment and further can individually totalize and print out exceptional items, which are not included in the description for collectively designating a plurality of totalization target items.

Third Embodiment

A third embodiment will now be described with reference to FIGS. 20 and 21.

FIG. 20 shows a table A in this embodiment, which differs from that of the first embodiment in that "," is affixed to a general name to be described in association with the totalization level in parentheses with "," affixed to a general name, an associated item code will be printed next to the record name (see FIG. 21) when a slip is printed out. In this case, at the time of reading the contents of the totalization file 13 from the top, record by record, the item code included in that key has only to be read, and printed, together with the name.

This embodiment has the same advantages as the first embodiment and has such a further advantage as to allow a user who does not precisely remember an item code to reconfirm it.

Although the mark "?" is affixed to a part of an item code as in "10?" or "3???" as the code condition for the totalization target item to collectively designate a plurality of items in the above-described embodiments, such items may be designed by a code condition like "123<?<134." Although code conditions are defined in the first and second designation items in the above embodiments, a third designation item may be provided where a code condition is also defined.

While the tables A and B are separately defined in the above embodiments, they may be collectively defined.

Although "," is affixed to a general name to print out the item code in association with the name in the third embodiment, no particular symbol need not be affixed. For example, each item code may be printed in association with the record name by simply designating the layout position of the record name.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data processing apparatus, comprising:

file storage means for storing a plurality of files each containing a plurality of records, each of said plurality of records containing a plurality of items;

table storage means for storing an index table containing an item code of each of said records, and an item title corresponding thereto;

first designating means for designating a totalization target file title to be extracted as output records, designating totalization target record files serving as general titles, to be extracted as output records, to layout positions indicating totalization levels at a time of outputting said output records, and designating code conditions indicating target items at a time of extracting said output records, in association with said record titles;

second designating means for designating a totalization target file title designated by said first designating means, and target items of said records indicating data items at a time of extracting said output records;

first read means for retrieving all records having item codes which match with said code conditions designated by said first designating means, and reading item codes in the records retrieved, and reading item titles corresponding to said item codes from said index table;

second read means for reading a record containing the item codes read out from said first read means, from said designated file, and for reading the item data which comply with the target items designated by said second designating means from the read record;

processing means for generating output records by giving the item title read out by said read means to said second read means; and output means for outputting an output record generated by said processing means in accordance with the totalization level of the layout position of the general output record title designated by said first designating means.

2. A data processing apparatus according to claim 1, wherein said first designating means designates at least said general output record title and said code conditions on the basis of a totalization definition table.

3. A data processing apparatus according to claim 1, wherein said first designating means assigns a specific symbol which indicates that assigned data is an all-inclusive output record title.

4. A data processing apparatus according to claim 1, further comprising:

print document storage means for storing a ruled line format corresponding to totalization levels; and print means for detecting for totalization levels of the records output from said output means, reading a ruled line format corresponding to the totalization levels, and printing the ruled line format along with the record.

5. A data processing apparatus, comprising:

file storage means for storing a plurality of files each containing a plurality of records, each of said plurality of records containing a plurality of items;

table storage means for storing an index table containing an item code of each of said records, and item titles corresponding thereto;

first designating means for designating general record titles to be extracted as output records, to layout positions indicating totalization levels at a time of outputting said output records, and designating code conditions for indicating collectively totalization target items of said records at a time of extracting said output records, in association with said record titles;

second designating means for designating the totalization target items of said records to be extracted as item data of the output records;

third designating means for designating record titles and item codes corresponding to the target items at a time of extracting said output records, to layout positions indicating a totalization level when each output record is output, in association with the record titles;

first read means for retrieving all records having the item codes which match with said code conditions designated by said first designating means, and reading item codes in the records retrieved, and reading item titles corresponding to said item codes from said index table;

second read means for reading the item data which match with the target item titles designated by said second designating means from the item code record read from said first read means;

third read means for reading records which match with the item codes designated by said third designating means;

first processing means for generating output records by giving the item title read out by said first read means to item data read out from said second read means;

second processing means for generating output records by giving the record title designated by said third designating means to the item data which match with the target items designated by said designating means, from a record read out by said third read means; and output means for outputting the output records generated by said first and second processing means in accordance with the totalization level of the layout positions of the output record of each of the first and second designating means, respectively.

* * * * *